(12) United States Patent  
Stojanovski

(10) Patent No.: US 7,044,695 B2
(45) Date of Patent: May 16, 2006

(54) MILLING TOOL

(76) Inventor: Stojan Stojanovski, 13300 W. Star Dr., Shelby Township, MI (US) 48315

( * ) Notice: Subject to any disclaimer, the term of this patent is extended or adjusted under 35 U.S.C. 154(b) by 130 days.

(21) Appl. No.: 10/883,052

(22) Filed: Jul. 2, 2004

(65) Prior Publication Data

US 2006/0002780 A1    Jan. 5, 2006

(51) Int. Cl.
B23C 5/22   (2006.01)

(52) U.S. Cl. .................... 409/234; 408/233; 407/36; 407/40; 407/41; 407/48

(58) Field of Classification Search ............... 409/234, 409/232; 408/233, 232, 231; 407/42, 41, 407/40, 48, 49, 47, 54, 36, 33–34
See application file for complete search history.

(56) References Cited

U.S. PATENT DOCUMENTS

| | | | |
|---|---|---|---|
| 3,776,656 A * | 12/1973 | Benjamin | 408/233 |
| 4,525,110 A * | 6/1985 | Stojanovski | 407/40 |
| 4,545,711 A | 10/1985 | Dooley | |
| 4,645,383 A | 2/1987 | Lindsay | |
| 5,064,316 A | 11/1991 | Stojanovski | |
| 5,108,234 A * | 4/1992 | Stojanovski | 407/40 |
| 5,468,102 A * | 11/1995 | Stojanovski | 409/234 |
| 5,580,194 A | 12/1996 | Satran et al. | |
| 5,632,576 A * | 5/1997 | Storch | 408/228 |
| 5,782,589 A | 7/1998 | Cole | |
| 5,863,157 A * | 1/1999 | Harano et al. | 408/233 |
| 5,904,448 A * | 5/1999 | Lee et al. | 407/42 |
| 5,921,719 A | 7/1999 | Laflamme | |
| 6,158,927 A * | 12/2000 | Cole et al. | 408/233 |
| 6,575,670 B1 | 6/2003 | Men | |
| 2001/0033776 A1 | 10/2001 | Villa | |
| 2002/0094244 A1* | 7/2002 | Satran et al. | 407/33 |
| 2005/0175422 A1* | 8/2005 | Jhang | 407/54 |

FOREIGN PATENT DOCUMENTS

EP      033086 A1 *  8/1981
EP      123887 A2 *  11/1984

* cited by examiner

Primary Examiner—Erica Cadugan
(74) Attorney, Agent, or Firm—Charles W. Chandler

(57) ABSTRACT

A milling cutter having a pair of clamping components mounted on a tool holder to form a slot for receiving a cutting insert. One of the clamping components forms an integral extension of the tool holder's shank. The two clamping components are fastened together by threaded fasteners. The insert is fastened to the clamping components by a second threaded fastener received in through-holes in the two components and a central opening in the cutting insert.

13 Claims, 2 Drawing Sheets

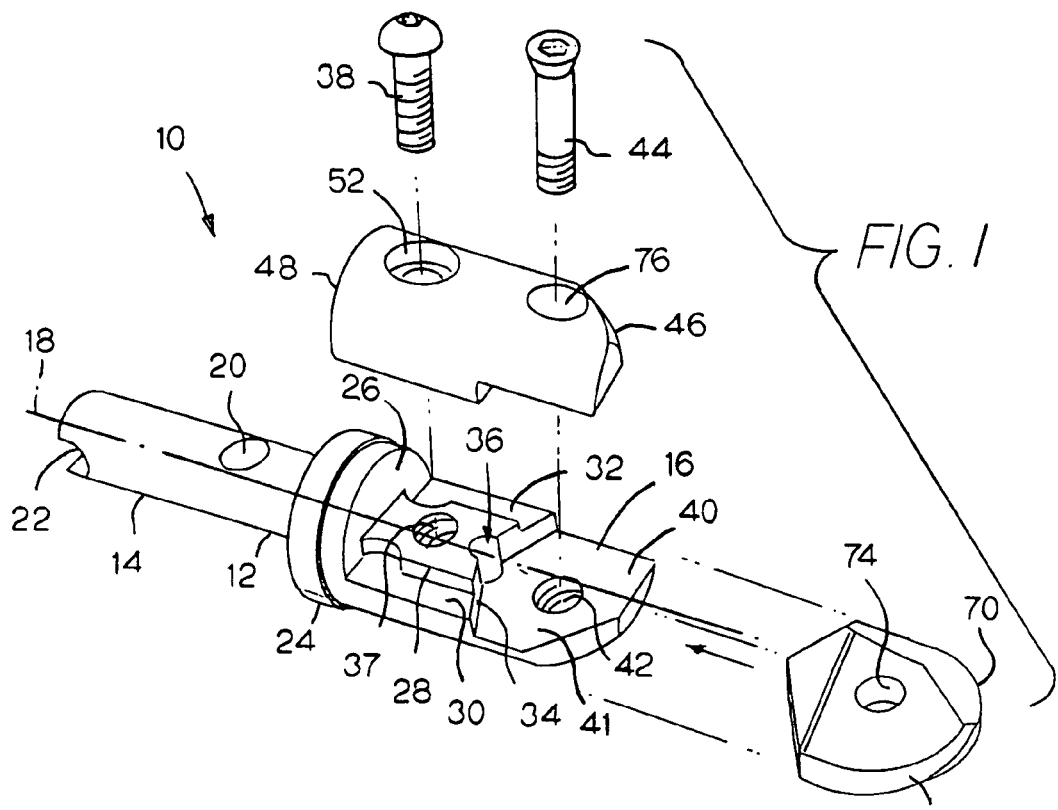
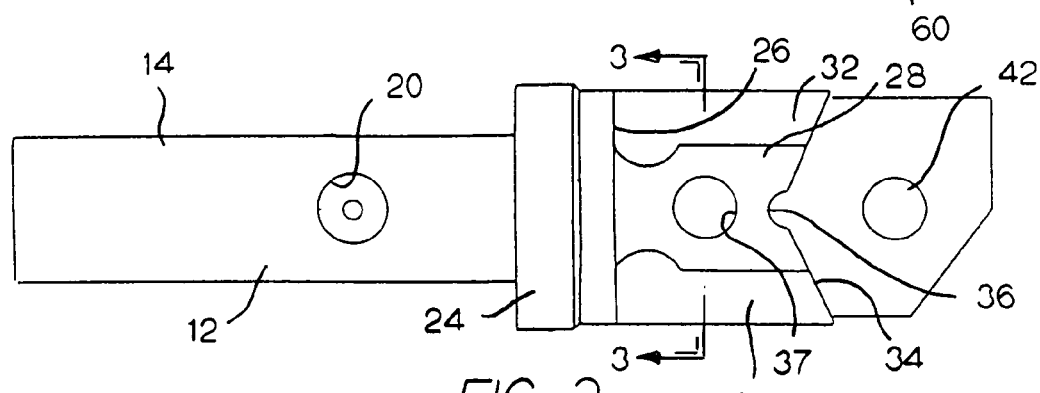
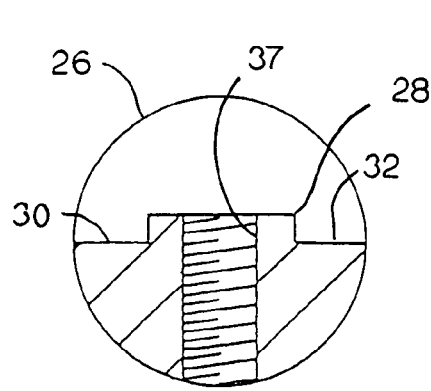
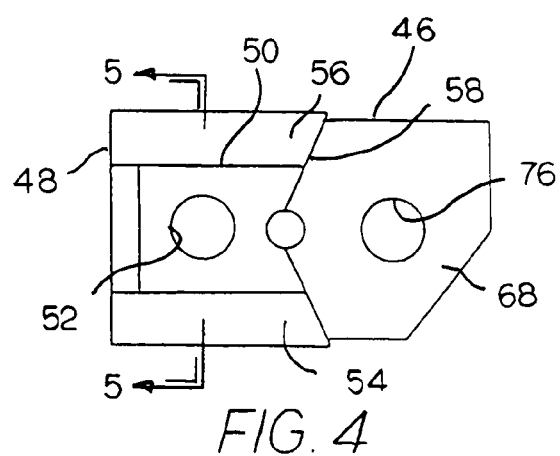

MILLING TOOL

BACKGROUND AND SUMMARY OF THE INVENTION

This invention relates to a milling cutter, and more particularly to a tool holder having a pair of clamping components forming a slot for receiving a milling cutting insert.

Milling cutters are commonly used in industry for a variety of metal cutting operations. A problem with conventional milling cutters is supporting a replaceable cutting insert. It is sometimes difficult to ensure that the cutting insert is on the centerline of the tool during a cutting operation.

A purpose of the present invention is to provide an improved tool holder for supporting a milling cutter insert.

The preferred embodiment of the invention comprises an elongated tool holder body having a shank at one end and a clamping component at the opposite, cutter head end. The shank is suited for connecting to a rotating driving means. A second removable clamping component is fastened to the tool holder body adjacent the first clamping component to form a slot for receiving the cutting insert. A fastener directly connects one clamping component to the other clamping component.

A camming screw passes through aligned holes in the two clamping components and a central hole in the cutting insert to connect the insert to the tool holder body.

The inner edge of the cutting insert has a V-shaped edge however it may take other configurations. The tool holder body has a V-shaped seat for receiving the V-shaped edge of the cutting insert to prevent it from being moved with respect to the tool holder body during a metal cutting procedure.

The camming screw biases the insert toward the V-shaped seat.

The first clamping component has an elongated longitudinal ridge. The second removable clamping component has a slot that mates with the ridge to prevent any lateral movement of one of the clamping components with respect to the other clamping component.

Some prior art related to this technology includes U.S. Pat. Nos. 6,575,670 issued Jun. 10, 2003 to Yuri Men for "Cutting Tool Assembly and Cutting Insert Therefor"; U.S. Pat. No. 5,921,719 issued Jul. 13, 1999 to Robert P. Laflamme for "Insert Holder with Top Clamp"; U.S. Pat. No. 5,782,589 issued Jul. 21, 1998 to John M. Cole for "Milling Cutter"; U.S. Pat. No. 5,580,194 issued Dec. 3, 1996 to Amir Satran et al. for "Cutting Tool"; U.S. Pat. No. 5,064,316 issued Nov. 12, 1991 to Stojan Stojanovski for "Ball Nose Milling Tool"; U.S. Pat. No. 4,645,383 issued Feb. 24, 1987 to Harold W. Lindsay for "End Milling Cutter and Method of Making Same" U.S. Pat. No. 4,545,711 issued Oct. 8, 1985 to Jimmy B. Dooley for "Tool Using Replaceable Bits"; and Publication No. 2001/0033776 published Oct. 25, 2001 to Stefano Villa for "Cutter Plate and Cutting Tool for Machining".

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is an exploded view of a tool holder and a cutting insert illustrating the preferred embodiment of the invention;

FIG. 2 is a plan view of the tool holder showing the inside edge of the V-shaped seat;

FIG. 3 is an enlarged view as seen along lines 3—3 of FIG. 2;

FIG. 4 is a view of the inner face of the removable clamping component;

DESCRIPTION OF THE PREFERRED EMBODIMENT

Figure 5:
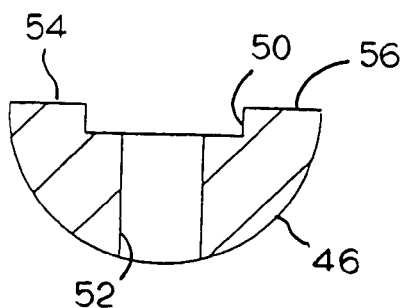
FIG. 5 is an enlarged view as seen along lines 5—5 of FIG. 4.

Referring to the drawings, FIG. 1 illustrates a preferred tool holder 10 comprising an elongated body 12 having a shank 14 at one end and a cutter head 16 at the opposite end.

The shank is adapted to be held in a rotating drive means, not shown, for rotation about a longitudinal axis 18. A recess 20 and a slot 22 provide means for connecting the tool holder to the drive means in a manner described in my U.S. Pat. No. 5,468,102. Other shank configurations can be used.

The shank is integrally attached to a collar 24 having a planar mounting face 26. Axis 18 is perpendicular to the plane of face 26.

The components of the preferred tool holder are made of suitable steel alloys adapted for the particular metal cutting application to which they are to be applied.

Referring to FIGS. 1 and 3, the cutter end of the tool holder has a ridge 28 extending longitudinally from face 26, and a pair of flat mounting surfaces 30 and 32 disposed in a common plane on opposite sides of ridge 28, and at right angles to face 26. Ridge 28 and mounting surfaces 30 and 32 terminate in a concave V-shaped seat 34. Seat 34 has an apex 36 adjacent rotating axis 18 of the body.

Referring to FIG. 2, ridge 28 has a tapped hole 37 for receiving a threaded fastener 38.

The outer end of the cutter head forms a clamping component 40 with a clamping surface 41 disposed in a plane that is parallel to mounting surfaces 30 and 32. Clamping surface 41 is recessed from mounting surfaces 30 and 32, about one-half the thickness of a cutting insert. Surface 41 has a tapped hole 42 for receiving a camming screw 44. The two tapped holes 37 and 42 are disposed along parallel axes and at right angles to mounting face 41. Mounting face 41 is disposed in a plane that is at right angles to face 26.

Referring to FIGS. 1 and 4, a removable second clamping component 46 is mounted on body 12 in abutment with clamping component 40. End face 48 abuts mounting face 26 of the collar.

Clamping component 46 has a longitudinal slot 50 that closely receives ridge 28 to prevent any lateral shifting between the two clamping components. Clamping component 46 also has a fastener-receiving through-hole 52 aligned with tapped hole 37 for receiving fastener 38 to tightly connect the two clamping components together.

Referring to FIG. 4, removable clamping component 46 has a pair of flat mounting surfaces 54 and 56, disposed in a common plane, on opposite sides of slot 50. The inner end of mounting surfaces 54, 56 and slot 50 terminate in a V-shaped concave seat 58 for receiving a cutting insert 60. When clamping component 46 is mounted on clamping component 40, mounting surfaces 30 and 32 abut mounting surfaces 56 and 54, respectively. Fastener 38 connects the two clamping components together.

V-shaped seat 58 on clamping component 46 is aligned with V-shaped seat 34 to form slot 64. Face 66 on removable clamping component 46 and face 68 on clamping component 40 are parallel to one another and spaced to tightly receive cutting insert 60.

Figure 7:
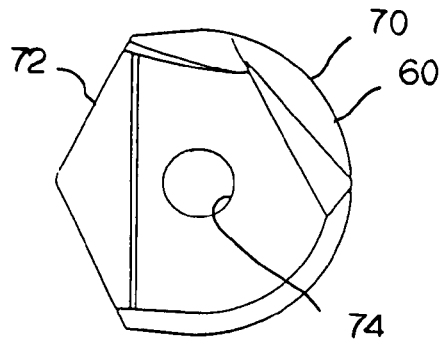
FIG. 7 is a view of the cutting insert.
Figure 9:
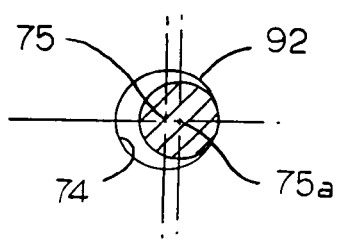
FIG. 9 is an enlarged view of camming screw in the insert opening.

Referring to FIGS. 1, 7 and 9, insert 60 has an outer cutting edge 70 which extends beyond the end of the cutter head. The insert has an inner end with a V-shaped convex edge 72 seated in V-shaped seats 34 and 58. The insert has a central through-hole 74 having an axis 75 slightly offset from axis 75a in threaded hole 42 and frustoconical hole 76.

Figure 6:
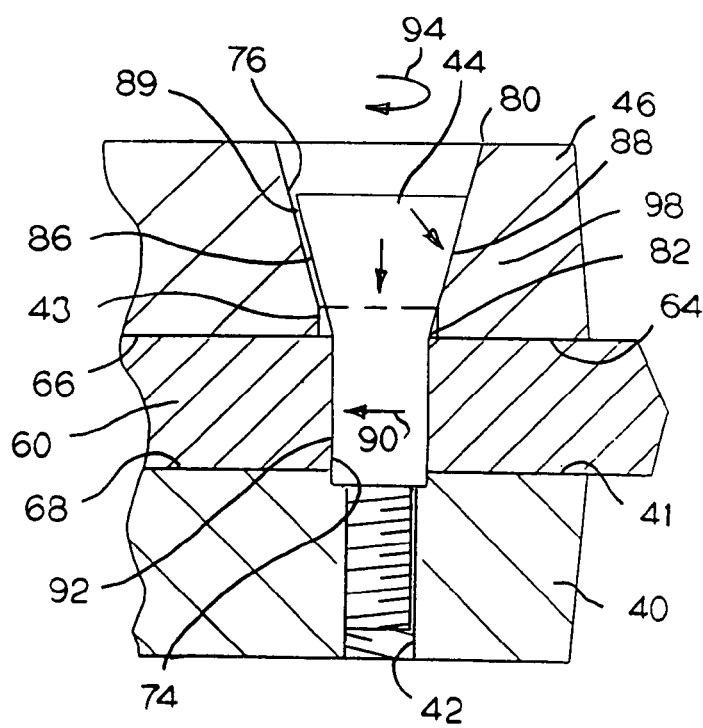
FIG. 6 is an enlarged longitudinal sectional view of the cutting tool clamped to the tool holder body.
Figure 8:
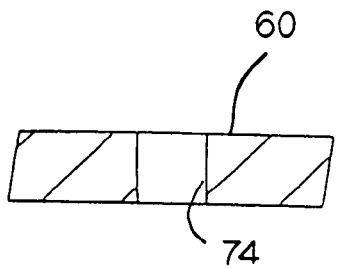
FIG. 8 is a sectional view of the cutting insert.

Referring to FIGS. 6–8, hole 76 is tapered from an elongated outer opening 80 to an annular enlargement 82. Camming screw 44 has a head 86 with a diameter less than the diameter of outer opening 80. The underside 88 of the camming screw head is also frustoconical, but slightly smaller than tapered hole 76 so that a small clearance exists permitting the camming screw to move in the direction 90.

The lower threaded end of the camming screw is slightly smaller than the threads of hole 42 to provide a small clearance permitting camming midsection 92 to slightly move in direction 90. Smooth, cylindrical camming midsection 92 abuts the inner end of insert through-hole 74.

The camming screw is turned in the direction of arrow 94 until the underside of the camming screw engages the right side of frustoconical hole 76, as viewed in FIG. 6. Turning the camming screw further causes the camming screw head to slide down tapered hole 76, moving camming midsection 92 in the direction of arrow 90. This movement of the camming screw biases the insert toward a locked position in abutment with V-shaped seats 34 and 58.

Further, as the head of the camming screw head slides down tapered hole 76, the camming screw head sandwiches that portion of clamping component 46 between the camming screw head and the insert in area 98 to further lock the insert in slot 64.

Turning the camming screw in the opposite direction releases the insert so the camming screw can be removed, and then the insert removed from slot 64.

Thus it is to be understood that I have described an improved milling tool holder in which the cutting insert is clamped at the outer end of the tool holder. The two clamping components have a mating ridge and slot to prevent any lateral movement of one of the components with respect to the other. The insert is biased against V-shaped seat in the two clamping components. The V-shaped seat may take other configurations so long as the configuration prevents the insert from being rotated with respect to the tool holder.

The invention claimed is:

1. A milling tool, comprising:
   an elongated bar having a longitudinal rotational axis, a shank at one end thereof, a cutter head forming an integral extension of the shank at the opposite end of the bar, and wherein the cutter head includes a first clamping structure having a first clamping face;
   the first clamping structure having a threaded fastener-receiving opening formed along an axis perpendicular to the first clamping face;
   a second clamping structure removably mounted on the first clamping structure to define an insert-receiving slot having opposed parallel insert clamping faces;
   the second clamping structure having a fastener-receiving opening aligned with the threaded fastener-receiving opening of the first clamping structure;
   a fastener disposed in the aligned fastener-receiving openings of the first clamping structure and the second clamping structure to prevent separation thereof,
   the first clamping structure having a threaded through-hole for receiving a camming screw;
   the second clamping structure having a through-hole, aligned with the threaded through-hole of the first clamping structure;
   a cutting insert disposed in the insert-receiving slot, the cutting insert having a fastener-receiving through-hole;
   a camming screw disposed in the aligned through holes of the first clamping structure, the second clamping structure and the cutting insert to retain the cutting insert in said insert-receiving slot for a metal cutting motion;
   the camming screw having a camming section with a diameter less than the diameter of the insert hole such that as the camming screw is rotated, the camming section biases the insert toward a seated position in the slot; and
   one of said clamping structures having a ridge and the other of said clamping structures having a channel, the channel receiving the ridge to prevent movement of the second clamping structure with respect to the first clamping structure.

2. The milling tool as defined in claim 1, in which the cutting insert has a non-circular peripheral edge disposed in said slot, and the first clamping structure has a wall in abutment with said peripheral edge to prevent movement of the insert with respect to said first clamping structure.

3. The milling tool as defined in claim 1, in which the cutting insert has a non-circular peripheral edge disposed in said slot, and the second clamping structure has a wall in abutment with said peripheral edge to prevent movement of the insert with respect to said second clamping structure.

4. The milling tool as defined in claim 1, in which the cutting insert has a V-shaped peripheral edge disposed in said insert-receiving slot, and at least one of said clamping structures has a V-shaped wall in abutment with said V-shaped peripheral edge.

5. The milling tool of claim 1, in which the ridge is a longitudinal ridge, and the channel is a longitudinal channel.

6. The milling tool of claim 5, in which the first clamping structure has a pair of parallel planar faces on opposite sides of said longitudinal ridge.

7. The milling tool of claim 6, in which the fastener-receiving opening of the first clamping structure is disposed between said planar faces.

8. The milling tool of claim 5, in which said ridge extends along the rotational axis of said bar.

9. In a milling tool holder, the combination of:
   an elongated tool holder body having a longitudinal axis, a first end comprising a cylindrical shank, and a second end;
   first and second spaced clamping components at the second end of the tool holder body having an insert-receiving slot, and defining a seat at an inner end of the insert-receiving slot;

the first clamping component having a through-hole having a first frustoconical surface;

the second clamping component having a threaded hole having an inner end opening to said slot, and axially aligned with the through-hole of the first clamping component;

a cutting insert received in said slot by a motion toward said inner seat, the cutting insert having a through-hole alignable with the through-hole of the first clamping component and the threaded hole of the second clamping component;

a camming screw having a first end with a head in the through-hole of the first clamping component, the head having a second frustoconical surface engageable with the first frustoconical surface, the frustoconical surface of said head having a smaller diameter than the frustoconical surface of the through-hole of the first clamping component, whereby the camming screw is movable when the insert is received in said slot to bias the insert toward said seat via a camming midsection of the camming screw having a non-threaded surface received in the through-hole of the insert; the camming screw having a second, opposite end threaded for a loose engagement with the threaded hole of the second clamping component when said insert is received into the insert-receiving slot, whereby the camming screw biases the insert toward said seat as the head of the camming screw penetrates the frustoconical opening of the first clamping component; and one of said clamping components having a ridge, and the other of said clamping components having a channel, the channel receiving the ridge to prevent movement of the first clamping component with respect to the second clamping component.

10. A milling tool holder as defined in claim 9, in which the seat is elongated in the direction in which the insert is biased toward said seat.

11. A milling tool holder as defined in claim 10, in which the camming midsection has a cylindrical surface formed about a central axis that is offset from the central axis of the insert through-hole.

12. In a milling tool, a combination comprising:

an elongated tool holder body having a longitudinal axis, a first end comprising a cylindrical shank, and a nose at the opposite second end thereof for supporting a milling tool insert;

first and second clamping components mounted on the body and spaced to form an insert-receiving slot, the slot having a seat at the inner end thereof;

the first clamping component having a through-hole having an inner end opening to said slot, and an outer end having a frustoconical opening;

the second clamping component having a threaded hole having an inner end opening to said slot, and axially aligned with the through-hole of the first clamping component;

a milling insert slidably received in said slot by a motion toward said inner seat, the milling insert having a through-hole alignable with the hole of the first clamping component and the hole of the second clamping component, but offset thereto;

an elongated fastener having a first end with an enlarged head, disposed on one side of the insert, a second opposite end threaded for engagement with the threaded hole of the second clamping component when said fastener is received in the through-hole of the insert whereby the fastener biases the insert toward said inner seat as the head of the threaded fastener penetrates the frustoconical opening of the first clamping component; and one of said clamping components having a ridge, and the other of said clamping components having a channel, the channel receiving the ridge to prevent movement of the first clamping component with respect to the second clamping component.

13. A milling tool holder as defined in claim 11, in which the threaded end of the fastener has a diameter smaller than that of the threaded hole in the second clamping component to accommodate the movement of the insert towards said seat.

* * * * *